Aug. 25, 1936.  G. W. BAUGHMAN  2,052,199
ELECTRIC BRAKE DEVICE
Filed Nov. 7, 1933
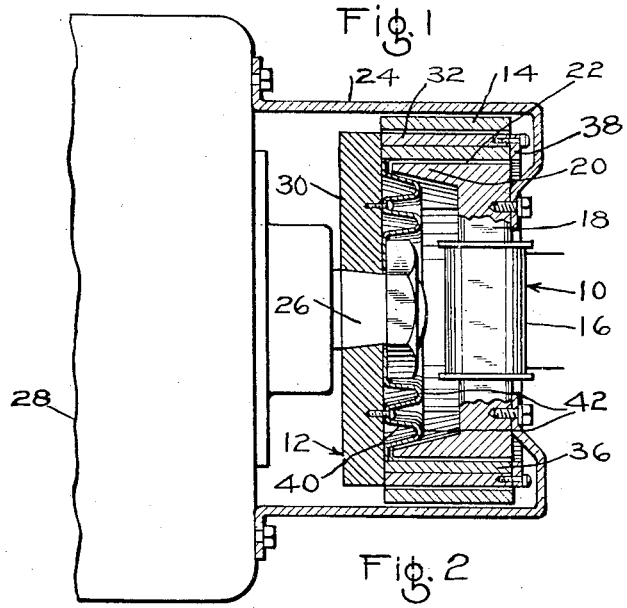
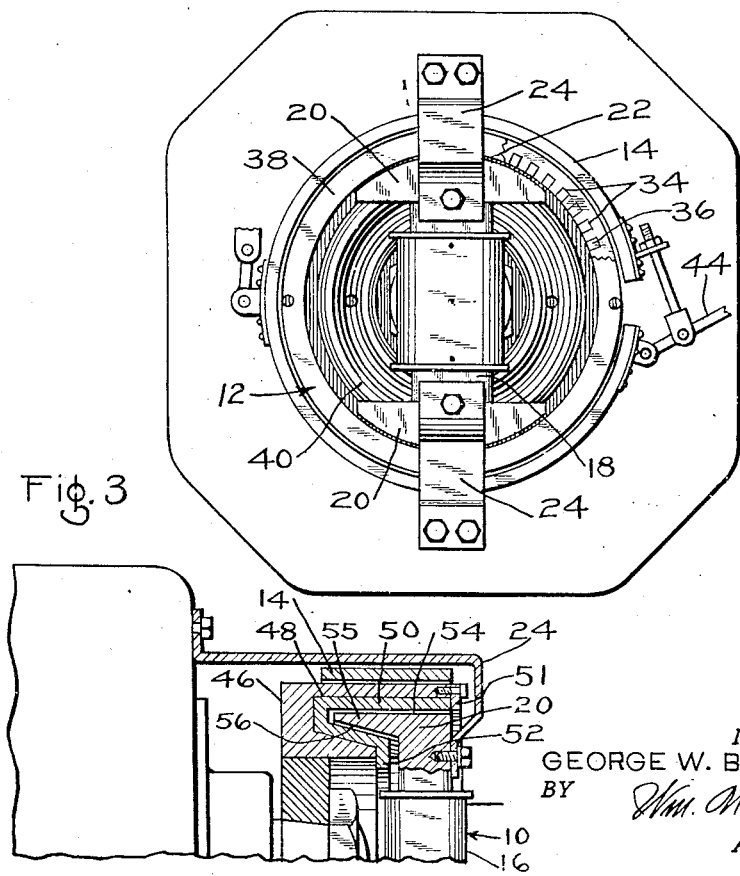
INVENTOR
GEORGE W. BAUGHMAN
BY
Wm. M. Cady
ATTORNEY Patented Aug. 25, 1936

2,052,199

UNITED STATES PATENT OFFICE 2,052,199

ELECTRIC BRAKE DEVICE

George W. Baughman, Edgewood, Pa., assignor to The Westinghouse Air Brake Company, Wilmerding, Pa., a corporation of Pennsylvania Application November 7, 1933, Serial No. 696,981

15 Claims. (Cl. 188—156)

This invention relates to vehicle brakes, and more particularly to an electro-dynamic brake of the eddy current type which is adapted to have compactly embodied therewith a brake of the friction type.

It is a general object of this invention to provide an efficient electro-dynamic brake of the eddy current type, wherein a relatively constant braking effect is maintainable over a greater part of the deceleration period when bringing a vehicle to a stop.

Another object is to provide an eddy current brake device in which the heretofore useless leakage fluxes are made useful to produce a braking effect.

Yet another object is to provide a simple and compact arrangement of elements in a combined eddy current and friction brake, which permits of common use of certain of the elements for both eddy current and friction braking.

A further object is to provide a brake of the eddy current type which is self-compensating for the usual loss in braking force due to expansion of heated parts, and which, because of this self-compensating feature, maintains a more nearly constant braking force for a given application of the brakes.

Further objects and advantages will be apparent from the following description, illustrated in the attached drawing, in which, Fig. 1 is a sectional view of a combined eddy current and friction brake associated with a vehicle motor.

Fig. 2 is an end view from the right in Fig. 1.

Fig. 3 is a fragmentary sectional view of a form of self-compensating air gap in an eddy current brake.

Referring now to Figs. 1 and 2, there is shown an embodiment of a combined eddy current and friction brake having a common rotatable brake drum member 12 with which is operably associated an electro-magnet 10 and a friction brake band 14.

The electro-magnet 10, forming a part of the eddy current brake, is provided with a winding 16 disposed on and insulated from a magnetic core member 18. The core member 18 has integral therewith, pole pieces 20 having faces of a configuration corresponding to the inner peripheral surface of the brake drum 12. Air gaps 22 are provided between the brake drum and the pole pieces 20. The electro-magnet 10 is preferably mounted within the brake drum 12 and supported by non-magnetic brackets 24 from any suitable rigid surface.

The brake drum 12 is shown as being rigidly secured to a drive shaft 26 of a vehicle motor 28, but it may be secured to any other shaft or member rotating as the vehicle moves. The brake drum 12 preferably comprises a hub portion 30 of non-magnetic material, to which is secured an annular braking portion 32 of magnetic material. The braking portion 32 is adapted to be engaged, on its outer peripheral surface, by the friction brake band 14 when the friction brake is applied. The inner peripheral surface of this braking portion 32 is provided over its full circumference with axially extending slots 34, in which are disposed electrical conductors 36. These conductors 36 extend for the full axial length of the slots 34 and are in electrical connection at one end with an end ring 38. The other end may be in electrical connection with either the non-magnetic hub portion 30 or a corrugated disc member 40 secured to the hub portion 30. The essential requirement of these end connections is to provide a current conducting path between the several conductors 36. The conductors 36, the end ring 38, and the disc member 40 need not necessarily be electrically insulated from the brake drum 12.

The corrugated disc member 40 is provided with a plurality of concentrically disposed corrugations or flutes 42 extending outwardly from the brake drum hub 30 and toward the electro-magnet 10. This disc is preferably made from non-magnetic material having good electrical and heat conducting properties, such for example as copper or brass, for a purpose to be disclosed hereinafter.

In operation, when the vehicle is moving the brake drum 12 is rotating. When it is desired to effect an application of the eddy current brake, current is supplied to the winding 16, which upon being energized establishes a magnetic flux having its main path through the core member 18, out one pole piece 20, across the adjacent air gap 22 to the brake drum 12, around the two halves of the magnetic braking portion 32 in parallel, across the other air gap 22, and back into the core 18 through the other pole piece 20. The conductors 36 in the rotating brake drum cut across this flux and have generated therein currents which have closed paths comprising the conductors cutting the flux, the end rings, and conductors outside the field of flux. These currents react with the magnetic flux producing them, to oppose or retard rotation of the brake drum, and hence produce a braking effect on the vehicle.

While a brake drum without the conductors 36 would have currents produced therein reacting to cause a braking effect, the use of the conductors, as shown, causes the generated currents to be concentrated in the more highly conductive paths afforded by the conductors, rather than be distributed throughout less conductive paths in the high resistance magnetic brake drum.

By making the brake drum hub 30 and the brackets 24 of non-magnetic material, practically all of the flux is confined to the path described, therefore concentrating the flux where it is most effective in producing a braking effect. There is still, however, some flux which does not follow this path, which leaks from the underside of one pole piece 20 to the underside of the other pole piece 20, or from one part of the core member 18 to another part. A large part of this leakage flux will be cut by the flutes or corrugations 42 of the disc member 40 rotating with the brake drum, and these corrugations will have generated therein, currents reacting to produce a braking effect similar to and in addition to that produced by currents in the conductors 36. Thus substantially all of the flux produced by the electro-magnet 10 is thereby made effective in producing a braking effect.

As the speed of the vehicle, and hence the speed of the brake drum, decreases, the eddy current braking force decreases due to lower currents being produced in the conductors 36, until at zero speed there would be no eddy current braking force. Therefore, in order to bring the vehicle to a stop quickly the friction brake must be applied.

When it is desired to effect an application of the friction brake, either concurrently with or independently of the application of the eddy current brake, force may be applied to the lever 44 by any of the well known means, to cause the brake band 14 to be contracted to frictionally engage the brake drum 12 and thus further retard its rotation to bring the vehicle to a stop.

During the application of either or both the friction brake and the eddy current brake, heat is produced in the brake drum 12, due to rubbing parts in the friction brake and the heating of the current carrying conductors 36 in the eddy current brake. The greater the area of the parts exposed to the air for liberating this heat, the lower will be the temperature of the brake parts. The disc member 40, with its flutes or corrugations 42, provides additional radiating surface for liberating this heat, thereby serving the dual purpose of acting both as an additional cooling agent and as a braking member.

When the brake drum 12 is heated it expands and the air gaps 22 are increased. This increase in the air gaps increases the reluctance of the flux path, thereby decreasing the flux produced by the electro-magnet 10 and hence decreasing the braking force. To overcome this, I may use a brake drum of the type shown in Fig. 3, wherein a braking portion 46 of the magnetic material is made heavy enough to have a suitably shaped annular recess 48 therein, in which are slots for accommodating conductors 50, in a manner similar to that described in connection with conductors 36. The conductors 50, and the slots accommodating them, extend in an axial direction over the faces of the recess 48, and the conductors 50 are connected at their ends to end rings 51 and 52. The shape of the recess 48 corresponds to the shape of the flanged portion 55 of the pole pieces 20, which projects into the recess 48, so as to form an outer air gap 54 and an inner air gap 56.

In operation, the conductors 50 serve the same purpose as the conductors 36 heretofore described. The magnetic flux will now include both the outer air gap 54 and the inner air gap 56 in its path, which is otherwise the same as before described. The two gaps can, of course, be made approximately of the same area, so that the flux is divided equally therebetween.

When the braking portion 46 of this brake drum expands, due to heating, the inner gap 56 will decrease in the same proportion that the outer gap 54 increases. Therefore, one gap compensates for the loss in braking force due to the other gap.

The friction brake is, as shown, arranged and applied as before described.

While I have shown spaced-apart conductors 36 and 50 in the embodiments illustrated, there are cases where there may be substituted for these a non-magnetic solid section cup or the like. For example, in the embodiment illustrated in Figs. 1 and 2, I may use a non-magnetic cup, in which the hub 30 is a part, and secure thereto a magnetic annulus corresponding to the annular braking portion 32.

While several illustrative embodiments of the invention have been described in detail, it is not my intention to limit its scope to these embodiments or otherwise than by the terms of the appended claims.

Having now described my invention, what I claim as new and desire to secure by Letters Patent, is:

1. In a combined friction and eddy current brake, the combination of a magnetic annulus, rotatable non-magnetic means supporting and carrying said annulus, means for frictionally engaging said annulus to produce a braking effect, and means for producing a magnetic flux in said annulus to produce an additional braking effect.

2. In a combined friction and eddy current brake, the combination of a magnetic annulus, rotatable non-magnetic means supporting and carrying said annulus, said annulus having complementary surfaces, electrical conductors associated with one of said surfaces, means for producing a flux adapted to link certain of said conductors, said non-magnetic means being effective to minimize leakage of said flux away from said conductors, and means for frictionally engaging another of said surfaces, whereby a combined friction and eddy current braking effect is produced.

3. In an eddy current brake, the combination of a rotatable braking member, means for producing a magnetic flux having several paths, one of said paths including said member, said flux being adapted to produce electric currents in said member when rotating acting to retard rotation thereof, and means including an axially projecting member acted upon by flux in another of said paths and being unaffected by flux in said first mentioned path adapted to have currents produced therein to additionally retard rotation of said member.

4. In an eddy current brake, the combination of a rotatable braking member, means for producing a flux in said member to cause retardation thereof when rotating, said means also producing a leakage flux exteriorly of said member, and means including concentrically disposed elements projecting into and acted upon by said leakage flux for causing additional retardation of said member.

5. In an eddy current brake, the combination of a magnetic rotatable brake drum, an electromagnet mounted interiorly of said drum and adapted to produce a main magnetic flux causing retardation of said drum when rotating, and a non-magnetic member rotatable with said drum and adapted to be acted upon by leakage flux from said electro-magnet but unaffected by said main flux for causing additional retardation of said drum.

6. In an eddy current brake, the combination of an electro-magnet for producing a magnetic flux, a rotatable cup-shaped brake drum having an annular magnetic portion adapted to rotate in said flux, a non-magnetic hub portion supporting said annular portion, and a non-magnetic member secured to said non-magnetic hub and having elements projecting therefrom, said elements being adapted to rotate in a leakage portion of said flux.

7. In a vehicle brake apparatus, the combination with a vehicle driving motor having a shaft, of a rotatable braking member secured to said shaft and having an annular braking portion extending beyond the end of said shaft, axially extending conductors disposed on said annular braking portion in spaced relation, electromagnetic means disposed within and relatively stationary with respect to said braking member and having pole pieces projecting radially toward the inner periphery of said annular portion, said electromagnet means being adapted to produce a magnetic flux linking said conductors and effective in producing an electric braking effect thereon, and a friction brake element adapted to engage the outer periphery of said annular portion for producing a friction brake effect thereon.

8. In a vehicle brake apparatus, the combination with a vehicle driving motor having a shaft, of a rotatable braking element secured to the end of said shaft and having an annular braking portion extending beyond said end, an electromagnet disposed within and relatively stationary with respect to said annular portion and having pole pieces projecting toward and in spaced relation with the inner periphery of said annular portion, a bracket having an axially extending portion secured to said motor and a radially extending portion secured to said electromagnet, and a friction brake element adapted to engage the outer periphery of said annular portion for producing a braking effect thereon.

9. In a vehicle brake apparatus, the combination with a vehicle driving motor having a shaft, of a non-magnetic hub member secured to the end of said shaft, an annular magnetic braking element carried by said hub member and projecting beyond the end of said shaft, an electromagnet disposed adjacently the end of said shaft and having pole pieces projecting outwardly toward and in spaced relation with the inner periphery of said element, and means for supporting said electromagnet from said motor.

10. In an eddy current brake device, the combination of a rotatable braking member having an annular recess therein, and relatively stationary electromagnetic means having pole pieces provided with tips projecting into said recess and adapted to form an inner and an outer air gap between said pole pieces and said braking member across which flux produced by said electromagnetic means passes, said gaps being arranged such that as the flux across one of said gaps decreases the flux across the other of said gaps increases as one of said members is heated.

11. In an eddy current brake device, the combination of a rotatable braking member having an axially extending annular recess therein, and a relatively stationary electromagnet provided with radially projecting pole pieces adapted to project into said annular recess to form an inner and an outer air gap across which flux produced by said electromagnet is adapted to pass, said gaps being arranged such that as the braking effect due to the flux across the outer gap decreases the braking effect due to the flux across the inner gap increases when said braking member is heated during the producing of a braking effect thereon.

12. In a vehicle brake apparatus, the combination with a vehicle driving motor having a driving shaft, of a rotatable braking member secured to said shaft and having an axially extending annular recess therein, an electromagnet having pole pieces provided with tips projecting into said annular recess and forming an inner air gap and an outer gap across which flux produced by said electromagnet is adapted to pass in separate paths, said gaps being arranged such that as they vary due to heating of said braking member and said pole tips one gap compensates for the loss of braking effect due to the other, means for supporting said electromagnet from said motor, and a friction brake element adapted to engage said braking member for producing a friction braking effect thereon.

13. In an eddy current brake, the combination with a braking member and an electromagnet member, said members being relatively rotatable and coacting to produce a braking effect, of means forming a plurality of air gaps between said members across which flux effective in producing a braking effect passes, said gaps being arranged such that as the flux across one gap increases due to heating of one of said members the flux across the other gap proportionately decreases.

14. In an electric brake device, in combination, a rotatable brake member, a stationary brake member, means for producing a magnetic flux in one of said members effective in producing a braking effect on said rotatable member, and elements associated with said members juxtaposed in a spaced relationship which provides parallel paths for the passage of flux from one of said members to the other and adapted when the temperature of one of said members increases over the temperature of the other of said members to proportion the flux between said two paths so that the braking effect produced is substantially constant.

15. In an electric brake device, in combination, a rotatable brake member, a stationary brake member, means for producing a magnetic flux in one of said members effective in producing a braking effect on said rotatable member, and elements associated with said members juxtaposed in a spaced relationship providing for the passage of flux from one of said members to the other through parallel paths, each of said paths including a segmental portion of said rotatable member, said elements being adapted as the temperature of one of said members increases over the temperature of the other of said members to proportion the flux between said parallel paths whereby the braking effect produced is maintained substantially constant.

GEORGE W. BAUGHMAN.